July 18, 1950 C. A. MAYNARD 2,515,414

TELEPHONE RECEIVER

Filed Sept. 8, 1947 2 Sheets-Sheet 1

Inventor
CHARLES A. MAYNARD by The Firm of Charles W. Hills Attys

July 18, 1950 C. A. MAYNARD 2,515,414

TELEPHONE RECEIVER

Filed Sept. 8, 1947 2 Sheets-Sheet 2

Inventor
CHARLES A. MAYNARD by The Firm of Charles W. Hills Attys.

Patented July 18, 1950 2,515,414

UNITED STATES PATENT OFFICE 2,515,414

TELEPHONE RECEIVER

Charles A. Maynard, Valparaiso, Ind., assignor to The Indiana Steel Products Company, Chicago, Ill., a corporation of Indiana Application September 8, 1947, Serial No. 772,696

6 Claims. (Cl. 179—114)

This invention relates to a telephone receiver, and more particularly to the magnetic circuit for a telephone receiver.

One of the principal features and objects of the present invention is to provide a telephone receiver construction having an improved magnetic circuit and employing high coercive force permanent magnet material.

It is a further object of the present invention to provide a novel headphone of the polarized type wherein the magnets have relatively short magnetic lengths, but relatively large cross-sectional area.

A still further object of the present invention is to provide a novel electromagnetic transducer head for changing fluctuating electric energy into sound.

Another and further object of the present invention is to provide a novel telephone receiver structure in which the magnetic yoke which provides the return flux path for the short permanent magnets also acts as the main support for the complete assembly.

The novel features which I believe to be characteristic of my invention are set forth with particularity in the appended claims. My invention itself, however, both as to its organization, and manner of construction, together with further objects and advantages thereof, may best be understood by reference to the accompanying drawings, in which:

Figure 1:
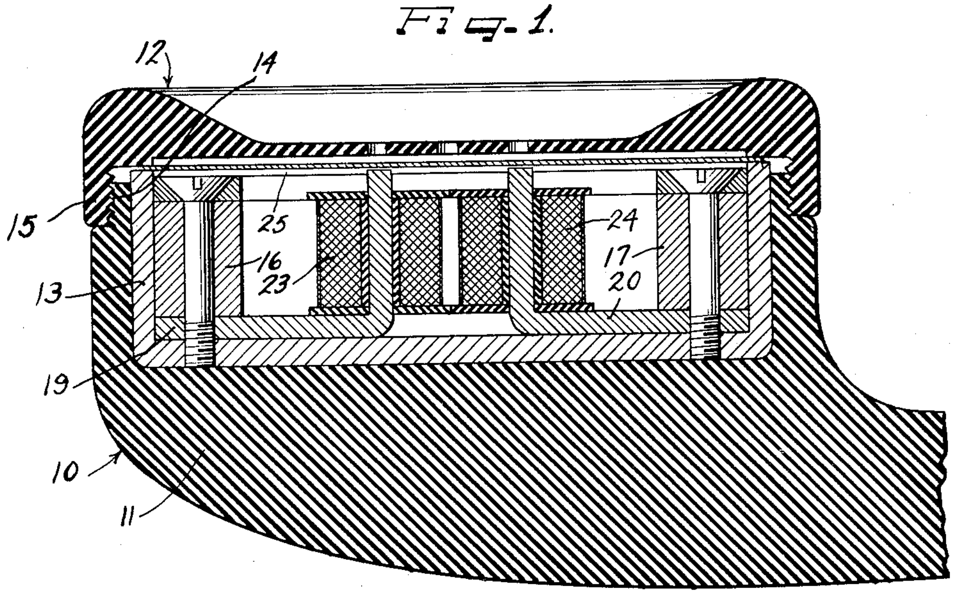
Figure 1 is a vertical sectional view through a telephone receiver embodying the novel characteristics and principles of the present invention.
Figure 2:
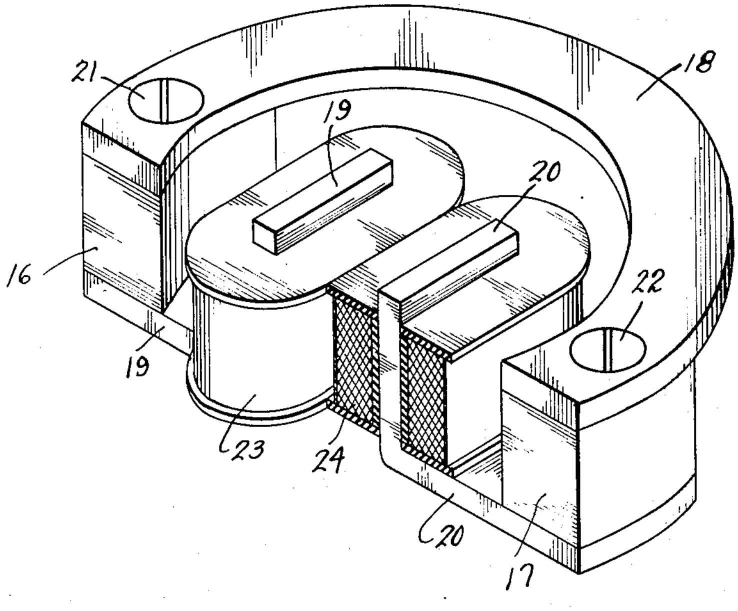
Figure 2 is an isometric view of the magnetic circuit and the operating signal coils of the receiver shown in Figure 1, with a portion of one coil broken away.

Referring first to the form of the invention shown in Figures 1 and 2 of the drawings, the telephone receiver 10 includes a housing 11 of non-magnetic material having a perforated cap 12 which is arranged to close the open end thereof. A metal inner shell or housing 13 of non-magnetic material is provided as the main support for the assembly. The housing 11 has a threaded upper end 14 which is arranged to receive the downturned outer flange 15 of the cap 12.

As may be seen best in Figure 2 of the drawings, the magnetic circuit of the receiver 10 includes a pair of permanent magnets 16 and 17 which are secured to a U-shape yoke member 18 of soft iron or other suitable magnetic material of relatively high permeability but low retentivity. The permanent magnets 16 and 17 are arranged so that the south pole of one of the permanent magnets is up, such, for example, as the magnet 16, while the north pole of the other permanent magnet, such, for example, as the magnet 17, is uppermost.

A pair of L-shaped pole pieces 19 and 20 are secured to the lower ends of the permanent magnets 16 and 17, respectively, suitable bolts 21 and 22 being employed to secure the assembly of the yoke 18, the permanent magnets 16 and 17, and the pole pieces 19 and 20 together. The L-shaped pole pieces 19 and 20 extend inwardly and then upwardly to a level just slightly above the yoke 18.

A pair of signal coils 23 and 24 are mounted over the upstanding leg portions of the pole pieces 19 and 20.

The assembly, as shown in Figure 2, is mounted in the housing 11 (see Figure 1) and a diaphragm 25 is clamped by the shoulder 26 on the cap 12 against the upper rim of the inner housing or main support member 13. The diaphragm 25 extends across the housing 11 in a conventional manner, and is disposed in a position just slightly spaced above the upper ends of the pole pieces 19 and 20. The diaphragm 25 is, of course, a thin circular diaphragm of iron or other suitable magnetic material having relatively high permeability and relatively low retentivity, and the center of this diaphragm is drawn toward the pole pieces 19 and 20 under some tension. When an alternating current flows through the coils 23 and 24, the field set up by the current alternately aids and opposes the steady field set up by the permanent magnets 16 and 17 so that the diaphragm 25 is alternately drawn nearer to and allowed to spring further away from the pole pieces 19 and 20.

It has been found that greatly improved results can be received in a telephone receiver and a better response characteristic maintained by using short permanent magnets of extremely high energy product such, for example, as an energy product of 4 or 5 million.

It has further been found that when a pair of such permanent magnets are employed in conjunction with a return flux path for the permanent magnets in the form of a magnetic yoke and then providing a pair of L-shaped soft iron pole pieces, that greatly improved results are obtained.

Figure 3:
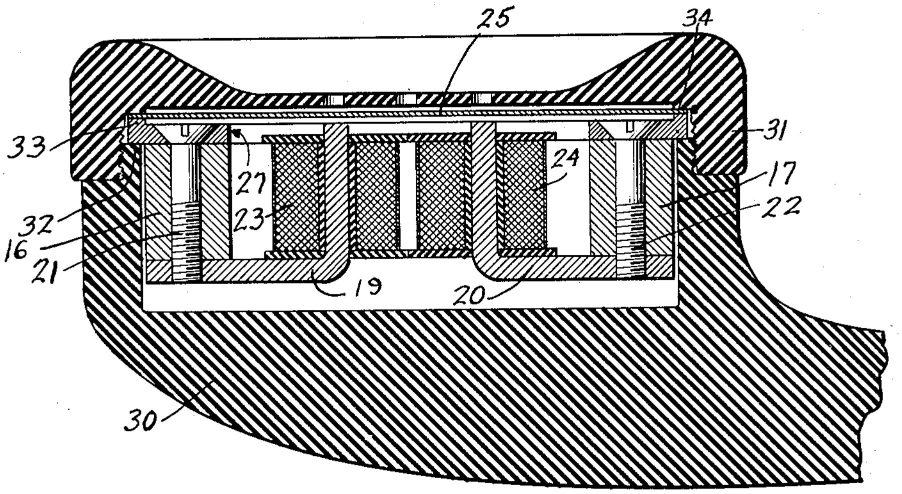
Figure 3 is a vertical sectional view of a modified form of telephone receiver.
Figure 4:
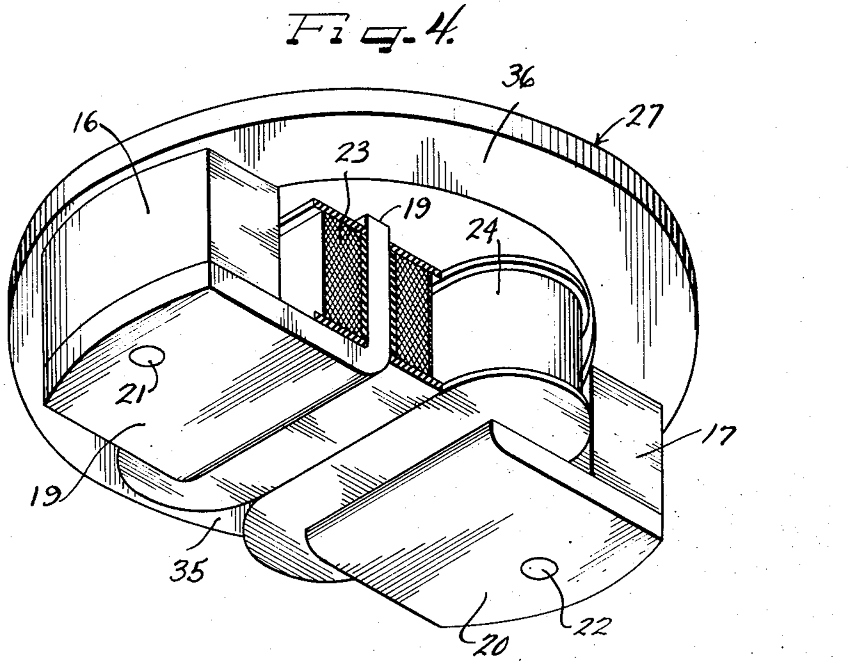
Figure 4 is an isometric view of the magnetic circuit and electrical coils of the modified form of the invention shown in Figure 3.

A modified form of the invention is shown in Figures 3 and 4 of the drawings. In this particular form of the invention a magnetic yoke 27 in the form of an annulus acts as the main support for the assembly as well as functioning as the return flux path for the permanent magnets 16 and 17. It is to be noted that the assembly as shown in Figure 4 is viewed from its under side in order that the various elements may be more clearly shown.

In this form of the invention, the L-shaped pole pieces 19 and 20 are similar to those discussed in the first form of the invention and are secured to the ends of the permanent magnets 16 and 17, which are opposite to that to which the circular magnetic yoke 27 is secured. The signal coils 23 and 24 are mounted on the vertically extending portions 28 and 29 of the L-shaped pole members 19 and 20. In this form of the invention the inner housing 13 of the first form of the invention has been eliminated, and only the outer housing member 30 with its associated cap 31 is provided for the magnetic circuit of the electric signal coils.

The housing 30 has a seat or shoulder portion 32 thereon upon which is seated the circular yoke 27. This yoke 27 has an upwardly extending outer flange portion or lip 33 upon which is seated the diaphragm 25. The cap member 31 is provided with an inner shoulder 34 which, when the cap is screwed down onto the lower housing member 30, forces the outer edge of the diaphragm 25 tightly against the lip 33 of the yoke 27 and thus, in turn, forces the yoke 27 tightly against the shoulder 32 of the lower housing member 30. It will thus be seen that the yoke 27 acts as the main support for all of the interior mechanism, both magnetic and electrical, of the receiver. The circular yoke or annulus 27 which is of soft iron or other suitable magnetic material, thus provides a dual return flux path for the permanent magnets 16 and 17, one of these circular paths being the semi-circular portion 35 which lies to one side of the permanent magnets 16 and 17, and the other or parallel flux path is through the other semi-circular portion 36 of the yoke 27 which lies to the other side of the permanent magnets 16 and 17.

In this embodiment of the present invention, as well as in the first embodiment of the present invention, the complete magnetic circuit is from the north pole of one permanent magnet, through the yoke to the south pole of the other permanent magnet, then from the north pole of this second permanent magnet, through the soft iron L-shaped pole piece to the soft iron diaphragm, through the diaphragm into the L-shaped pole piece of the first permanent magnet and from there into the south pole of the first permanent magnet. It will thus be apparent that a very efficient magnetic circuit is provided.

It will further be observed that, by the use of very high coercive force permanent magnet materials, permanent magnets may be employed which are of relatively short magnetic lengths, but of relatively large cross-section, thereby to keep the receiver small and compact.

The term "electromagnetic transducer" will hereinafter be used to refer to a telephone receiver or head set which is arranged to convert fluctuating energy of one form into fluctuating energy of another form, such, for example, as fluctuating electric energy into sound.

While I have shown certain particular embodiments of my invention, it will, of course, be understood that many other modifications may be made embodying the teachings and principles of the present invention.

I claim as my invention:

1. An electromagnetic transducer comprising a pair of permanent magnets mounted in side by side spaced relationship with their magnetic axes substantially parallel and oriented in opposite directions, a relatively thin curvilinear yoke of magnetic material of high magnetic permeability but low magnetic retentivity secured to each of one set of ends of said permanent magnets, a pair of pole pieces extending from the other set of ends of said permanent magnets, a resilient ferromagnetic diaphragm mounted in closely spaced relation to the free ends of said pole pieces, and signal coils on said pole pieces.

2. An electromagnetic transducer comprising a pair of permanent magnets mounted in side by side spaced relationship with their magnetic axes substantially parallel and oriented in opposite directions, a relatively thin curvilinear yoke of magnetic material of high magnetic permeability but low magnetic retentivity secured to each of one set of ends of said permanent magnets, a pair of L-shaped pole pieces extending first toward each other and then upwardly between said permanent magnets and connected respectively to the ends of said permanent magnets so as to lie opposite to that to which said yoke is connected, a resilient ferromagnetic diaphragm mounted in closely spaced relation to the free ends of said pole pieces, and signal coils mounted on said pole pieces.

3. An electromagnetic transducer comprising a pair of permanent magnets mounted in side by side spaced relationship with their magnetic axes substantially parallel and oriented in opposite directions, a relatively thin curvilinear yoke of magnetic material of high magnetic permeability but low magnetic retentivity secured to each of one set of ends of said permanent magnets, a pair of L-shaped pole pieces extending first toward each other and then upwardly between said permanent magnets and connected respectively to the ends of said permanent magnets as to lie opposite to that to which said yoke is connected, a resilient ferromagnetic diaphragm mounted in closely spaced relation to the free ends of said pole pieces, and signal coils mounted on said pole pieces, the free ends of said pole pieces terminating in a plane slightly above the plane of the upper surface of said yoke.

4. An electromagnetic transducer comprising a pair of permanent magnets mounted in side by side spaced relationship and oriented in opposite directions, a U-shaped ferromagnetic yoke secured to the upper ends of said permanent magnets and providing a magnetic flux path therebetween, a pair of L-shaped pole members of ferromagnetic material secured to the lower ends of said permanent magnets, said L-shaped pole members extending toward each other and then up between said permanent magnets and terminating slightly above said yoke, a non-magnetic housing in which said permanent magnets, said yoke, and said pole members are mounted, a resilient ferromagnetic diaphragm marginally secured in said housing and disposed in closely spaced relation to the free ends of said pole members, and signal coils on said pole pieces.

5. An electromagnetic transducer comprising an open-ended housing of non-magnetic material, a cap having openings therein for closing the open end of said housing, a ferromagnetic yoke member in the form of an annulus, a pair of permanent magnets secured to diametrically opposite portions of said annulus with their magnetic axes perpendicular to the plane of said annulus and oriented in opposite directions with respect to each other, a pair of L-shaped pole pieces secured to the opposite ends of said permanent magnets and extending first toward each other and then upwardly between said permanent magnets and through the central opening of said annulus, a pair of signal coils mounted on the upwardly extending portions of said pole pieces, said annulus being secured to said housing and acting as the sole support for the magnetic and electric circuit of said transducer, and a ferromagnetic resilient diaphragm secured in closely spaced relation above the free ends of said pole pieces.

6. An electromagnetic transducer comprising an open-ended housing of non-magnetic material, a cap having openings therein for closing the open end of said housing, a ferromagnetic yoke member in the form of an annulus, a pair of permanent magnets secured to diametrically opposite portions of said annulus with their magnetic axes perpendicular to the plane of said annulus and oriented in opposite directions with respect to each other, a pair of L-shaped pole pieces secured to the opposite ends of said permanent magnets and extending first toward each other and then upwardly between said permanent magnets and through the central opening of said annulus, a pair of signal coils mounted on the upwardly extending portions of said pole pieces, said housing having a seat for receiving said annulus, a resilient ferromagnetic diaphragm, said annulus having a seat for said diaphragm, and said cap being arranged to secure said diaphragm and said annulus against said annulus seat of said housing whereby said annulus provides the sole support for the complete assembly as well as providing a return flux path for said permanent magnets.

CHARLES A. MAYNARD.

REFERENCES CITED

The following references are of record in the file of this patent:

UNITED STATES PATENTS

| Number | Name | Date |
|---|---|---|
| 1,414,105 | Timmons | Apr. 25, 1922 |
| 1,530,323 | Pratt | Mar. 17, 1925 |
| 1,537,322 | Nielsen | May 12, 1925 |
| 1,624,338 | Hanna | Apr. 12, 1927 |
| 2,249,158 | Morrison | July 15, 1941 |
| 2,353,550 | DeForest | July 11, 1944 |